United States Patent
Hamilton, II et al.

(10) Patent No.: US 8,417,649 B2
(45) Date of Patent: Apr. 9, 2013

(54) PROVIDING A SEAMLESS CONVERSATION SERVICE BETWEEN INTERACTING ENVIRONMENTS

(75) Inventors: Rick A. Hamilton, II, Richmond, VA (US); Neal M. Keller, Yorktown Heights, NY (US); Clifford A. Pickover, Yorktown Heights, NY (US); Josef Reisinger, Bonn Beuel (DE)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/501,933

(22) Filed: Jul. 13, 2009

(65) Prior Publication Data

US 2011/0010316 A1    Jan. 13, 2011

(51) Int. Cl.
*G06F 15/18* (2006.01)
(52) U.S. Cl. .......................................... 706/12
(58) Field of Classification Search ........................ None
See application file for complete search history.

(56) References Cited

U.S. PATENT DOCUMENTS

| | | |
|---|---|---|
| 6,643,639 B2 | 11/2003 | Biebesheimer et al. |
| 6,693,651 B2 | 2/2004 | Biebesheimer et al. |
| 6,701,311 B2 | 3/2004 | Biebesheimer et al. |
| 6,778,193 B2 | 8/2004 | Biebesheimer et al. |
| 6,785,676 B2 | 8/2004 | Oblinger |
| 6,853,998 B2 | 2/2005 | Biebesheimer et al. |
| 6,873,990 B2 | 3/2005 | Oblinger |
| 7,546,343 B2 | 6/2009 | Benco et al. |
| 7,685,017 B2 | 3/2010 | Matsui et al. |
| 7,979,574 B2 | 7/2011 | Gillo et al. |
| 2002/0083119 A1 | 6/2002 | Matsui et al. |
| 2004/0205176 A1 | 10/2004 | Ting et al. |
| 2007/0038759 A1 * | 2/2007 | Hanson et al. ................ 709/227 |
| 2007/0136422 A1 | 6/2007 | Ohtani et al. |
| 2008/0025307 A1 | 1/2008 | Preiss et al. |
| 2008/0052242 A1 | 2/2008 | Merritt et al. |
| 2008/0214253 A1 | 9/2008 | Gillo et al. |
| 2008/0215679 A1 | 9/2008 | Gillo et al. |
| 2008/0215994 A1 | 9/2008 | Harrison et al. |
| 2008/0235582 A1 | 9/2008 | Zalewski et al. |
| 2008/0263460 A1 | 10/2008 | Altberg et al. |
| 2009/0019367 A1 | 1/2009 | Cavagnari et al. |
| 2009/0089439 A1 | 4/2009 | Benco et al. |
| 2009/0158170 A1 | 6/2009 | Narayanan et al. |

OTHER PUBLICATIONS http://en.wikipedia.org/wiki/Roaming, 2008, pp. 6.*

(Continued)

*Primary Examiner* — Jeffrey A Gaffin
*Assistant Examiner* — Li-Wu Chang
(74) *Attorney, Agent, or Firm* — William E. Schiesser; Hoffman Warnick LLC

(57) ABSTRACT

An approach that provides a seamless conversation service between interacting environments is described. In one embodiment, there is a seamless conversation service tool that includes a conversation commencement component configured to facilitate commencement of a conversation between two or more parties occurring over a communication path in one of two or more interacting environments. A user context monitoring component is configured to monitor a user context associated with the conversation. A user context change identification component is configured to identify a change in the user context of the conversation. A conversation transfer component is configured to transfer the conversation between the two or more interacting environments in response to the identified change in the user context, while maintaining a transparency of functionality of the communication path.

20 Claims, 5 Drawing Sheets

OTHER PUBLICATIONS

Sidddiqui et al. "Mobility management across hybrid wireless networks: Trends and challenges", Computer Communications 29 (2006), pp. 1363-1385.*

Calvagna et al. "A User-Centric Analysis of Vertical Handovers", WMASH 2004, pp. 137-146.*

Dagiuklas et al. "Seamless Multimedia Network and Service Access Over All-IP Based Infrastructures: The EVOLUTE Approach", European Transactions on Telecommunications Journal. Oct. 2003 Issue, pp. 27.*

Edwards, Office Communication for U.S. Appl. No. 12/144,776 dated Sep. 1, 2010, 20 pages.

Edwards, Office Communication for U.S. Appl. No. 12/144,776 dated Feb. 15, 2011, 16 pages.

IBM-OmniFind Enterprise Edition—Text Analytics and UIMA, "OmniFind Enterprise Edition", Retrieved on Mar. 6, 2008 from: http://www-306.ibm.com/software/data/enterprise-search/omnifind-enterprise/uima.html, 1 page.

Nuance—Speech Solutions—"Nuance Recognizer V9", Retrieved from: http://www.nuance.com/recognizer/, 2008 Nuance Communications, Inc.

Edwards, Notice of Allowance and Fee(s) Due for U.S. Appl. No. 12/144,776 dated Apr. 6, 2012, 19 pages.

* cited by examiner

PROVIDING A SEAMLESS CONVERSATION SERVICE BETWEEN INTERACTING ENVIRONMENTS

TECHNICAL FIELD

This invention relates generally to communications, and more specifically to providing a seamless conversation service between a variety of interacting environments.

BACKGROUND

An interacting environment is generally an aggregate of surrounding things, conditions, or influences where parties associated therewith can act together or towards others or with others. For example, an interacting environment can include the real world and a virtual environment such as a virtual universe and a social network. Parties within these interacting environments conduct conversations on a frequent basis. A conversation is generally an act of interaction between two or more parties where thoughts, information, etc., are expressed and received. The conversation can be conveyed via a communication path. A communication path is generally a medium in which the conversation is conveyed. Examples of communication paths in an interacting environment include telecommunication devices (e.g., phones), chatting, instant messaging, emailing, blogging, video communications (e.g., video streaming) and file sharing.

As virtual environments such as virtual universes and social networks become more prevalent in their usage, it is likely that these environments will merge with the real world. For example, it is possible that parties may desire to maintain interactions with each other as parties move from one interacting environment to another without having to endure interruptions in these interactions.

SUMMARY

In one embodiment, there is a method for providing a seamless conversation service between interacting environments. In this embodiment, the method comprises: facilitating commencement of a conversation between two or more parties over a communication path in a first interacting environment; and enabling the two or more parties to seamlessly continue the conversation in a second interacting environment while maintaining a transparency of functionality of the communication path.

In a second embodiment, there is a computer system for providing a seamless conversation service between two or more interacting environments. In this embodiment, the system comprises at least one processing unit and memory operably associated with the at least one processing unit. A seamless conversation service tool is storable in memory and executable by the at least one processing unit. The tool comprises a conversation commencement component configured to facilitate commencement of a conversation between two or more parties occurring over a communication path in one of the two or more interacting environments. A user context monitoring component is configured to monitor a user context associated with the conversation. A user context change identification component is configured to identify a change in the user context of the conversation. A conversation transfer component is configured to transfer the conversation between the two or more interacting environments in response to the identified change in the user context, while maintaining a transparency of functionality of the communication path.

In a third embodiment, there is a computer-readable medium storing computer instructions, which when executed, enables a computer system to provide a seamless conversation service between two or more interacting environments. In this embodiment, the computer instructions comprises: facilitating commencement of a conversation between two or more parties occurring over a communication path in the two or more interacting environments; monitoring a user context associated with the conversation; identifying a change in the user context of the conversation; and enabling a transfer of the conversation between the two or more interacting environments in response to the identified change in the user context, while maintaining a transparency of functionality of the communication path.

In a fourth embodiment, there is a method for providing a seamless conversation service tool as a service for facilitating a seamless transfer of a conversation between interacting environments. In this embodiment, the method comprises deploying the seamless conversation service tool in a computer system as a service that is in communication with one or more interacting environments. The seamless conversation service tool is operable to: facilitate commencement of a conversation between two or more parties over a communication path in a first interacting environment; enable the two or more parties to seamlessly continue the conversation in a second interacting environment while maintaining a transparency of functionality of the communication path; and levy a transfer fee to a provider of the one or more interacting environments or the two or more parties conducting the conversation.

In a fifth embodiment, there is a method for deploying a seamless conversation service tool for use in a computer system that facilitates a seamless transfer of a conversation between interacting environments. In this embodiment, a computer infrastructure is provided and is operable to: facilitate commencement of a conversation between two or more parties over a communication path in a first interacting environment; and enable the two or more parties to seamlessly continue the conversation in a second interacting environment while maintaining a transparency of functionality of the communication path.

DETAILED DESCRIPTION

Figure 1:
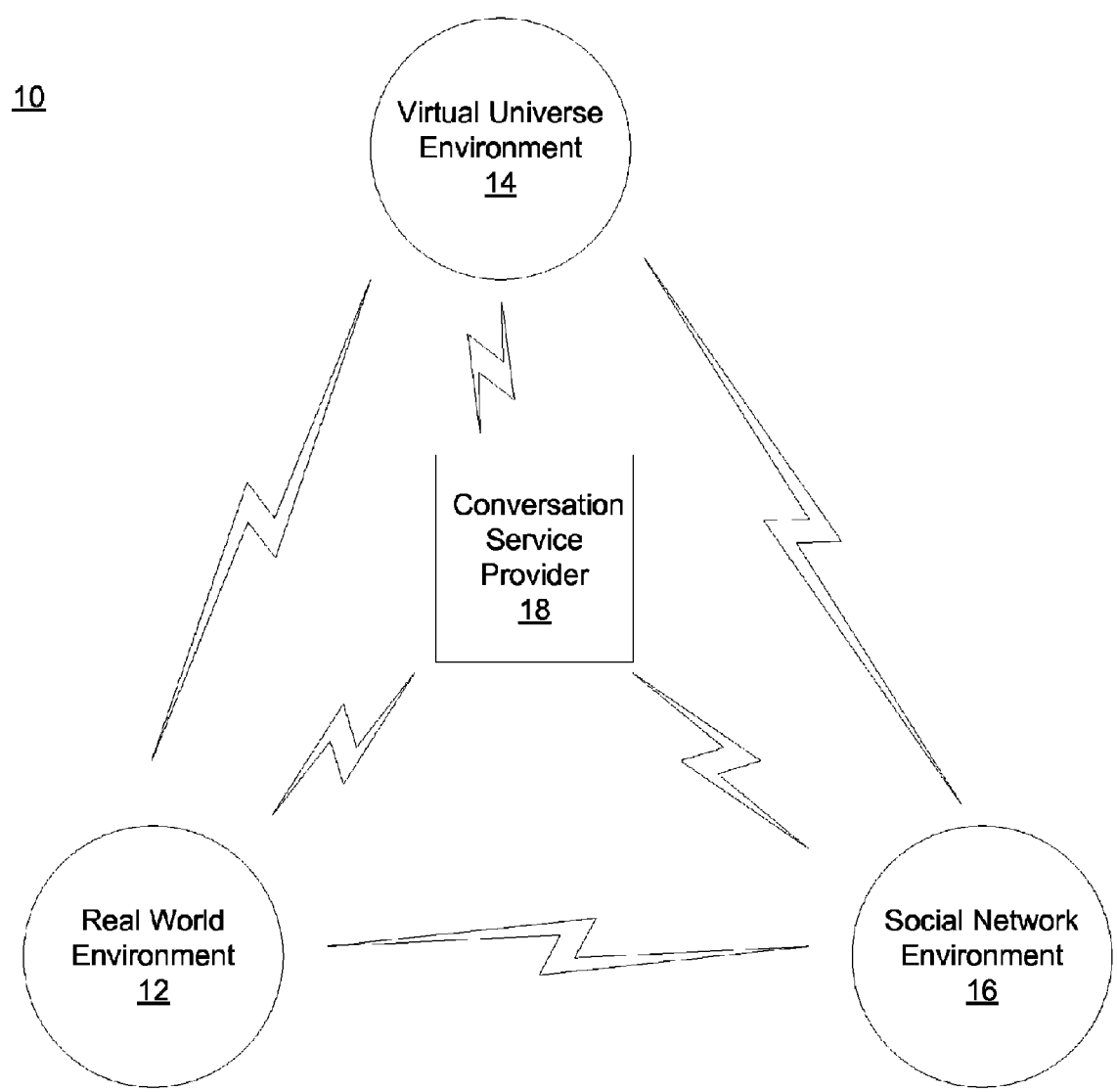
FIG. 1 shows a high-level schematic diagram showing a networking configuration for providing a seamless conversation service between interacting environments according to one embodiment of this invention.

Presently, there are no approaches available that enable parties to seamlessly continue a conversation occurring over a communication path in one interacting environment (e.g., a real world environment or virtual environment) in another interacting environment.

Embodiments of this invention are directed to a technique for providing a seamless conversation service between a variety of interacting environments that can include a real world environment and virtual environments such as a virtual universe and social network. The embodiments of this invention can automatically enable two or more parties to seamlessly continue a conversation taking place on a communication path from a first interacting environment to further environments while maintaining a transparency of functionality of the path. Additionally, the seamless continuation of the conversation can occur at the request of the parties conducting the conversation. In the embodiment where the conversation is continued automatically, the user context associated with the conversation is monitored and any identified changes in the user context are used to decide whether to enable or deny the seamless transfer of the conversation to another interacting environment. In particular, user context data describing attributes that are relevant to behavioral needs of the two or more parties are extracted from the conversation. Attributes that are relevant to behavioral needs in the interacting environment can include a wide range of attributes such as location, presence, identity, activity, conversational, and search information. These types of attribute information can be ascertained using machine learning techniques that include unsupervised and supervised machine learning techniques. In the embodiment where the conversation is continued per a request from one or more of the parties, a number of approaches are suitable for expressing a desire to continue the conversation. Upon receiving an indication that the parties desire to continue the conversation in another interacting environment, then a decision can be made to enable or deny a seamless transfer of the conversation. A rules database including a plurality of predetermined communication rules and a user context database containing a plurality of user context data can be used in both embodiments to aid in this decision to transfer the conversation.

Embodiments of this invention have benefits to users in the interacting environments and to the service providers of these environments. For example, users can continue conversations as they move between social networks and virtual universes without needing to manually adjust communications technologies to recreate the same conversation characteristics in the destination environment. Another benefit to the approaches described in this invention is that past behavior in social networks and virtual universes is leveraged to provide customized conversation services. A further benefit with these approaches is that privacy issues or communications challenges are eliminated. With respect to the benefits for the service providers, additional revenue and customer loyalty can be generated by providing value added services above the bit transport layer (e.g., the transparent data connection between client and telecom operator). Additionally, context based advertising and marketing can leverage the knowledge of user context changes to provide "just in time" notification of availability of relevant services to the parties. For example, if parties are discussing cars in a social network and they move into a virtual universe, then an advertisement for an automobile can be transmitted to the users or they can receive an invitation to transport to island or region that specializes in selling automobiles.

FIG. 1 shows a high-level schematic diagram showing a networking configuration 10 for providing a seamless conversation service between interacting environments according to one embodiment of this invention. As mentioned above, an interacting environment is generally an aggregate of surrounding things, conditions, or influences where parties associated therewith can act together or towards others or with others. An interacting environment can include a real world environment (i.e., the real world) and a virtual environment such as a virtual universe and a social network. FIG. 1 shows a real world environment 12, a virtual universe environment 14, and a social network environment 16. Those skilled in the art will recognize that this configuration is only illustrative of one possible implementation and that there may be additional real world, virtual universe and social network environments than what is shown in FIG. 1. Additionally, there may be other types of interacting environments than what is shown in FIG. 1.

The real world environment 12, virtual universe environment 14, and social network environment 16 are all connected to each other through a network provided by a conversation service provider 18. A conversation service provider 18 such as a communications service provider facilitates the transport of conversation information electronically between the real world environment 12, virtual universe environment 14, and social network environment 16 over a medium that may include wireline, wireless, Internet, cable, satellite, and managed services businesses. As mentioned above, a conversation is generally an act of interaction between two or more parties where thoughts, information, etc., are expressed and received. The conversation can be conveyed via a communication path or channel. As used herein, a communication path is generally the medium in which the conversation is conveyed. Examples of communication paths include telecommunications (e.g., phones), chatting, messaging, emailing, blogging, video communications (e.g., video streaming) and file sharing.

The conversation service provider 18 utilizes a seamless conversation service tool that enables or prevents two or more parties to seamlessly continue a conversation taking place on a communication path in a first interacting environment to a second interacting environment while maintaining a transparency of functionality of the path. For example, the seamless conversation service tool can be used to allow parties talking in the real world environment 12 to continue that conversation in the virtual universe environment 14. Instead of automatically performing the seamless transfer of the conversation, the seamless conversation service tool can also be used to perform this function at the request of the parties having the conversation. Upon receiving the request, the conversation service provider 18 using the tool can enable or deny the request to continue the conversation.

Figure 2:
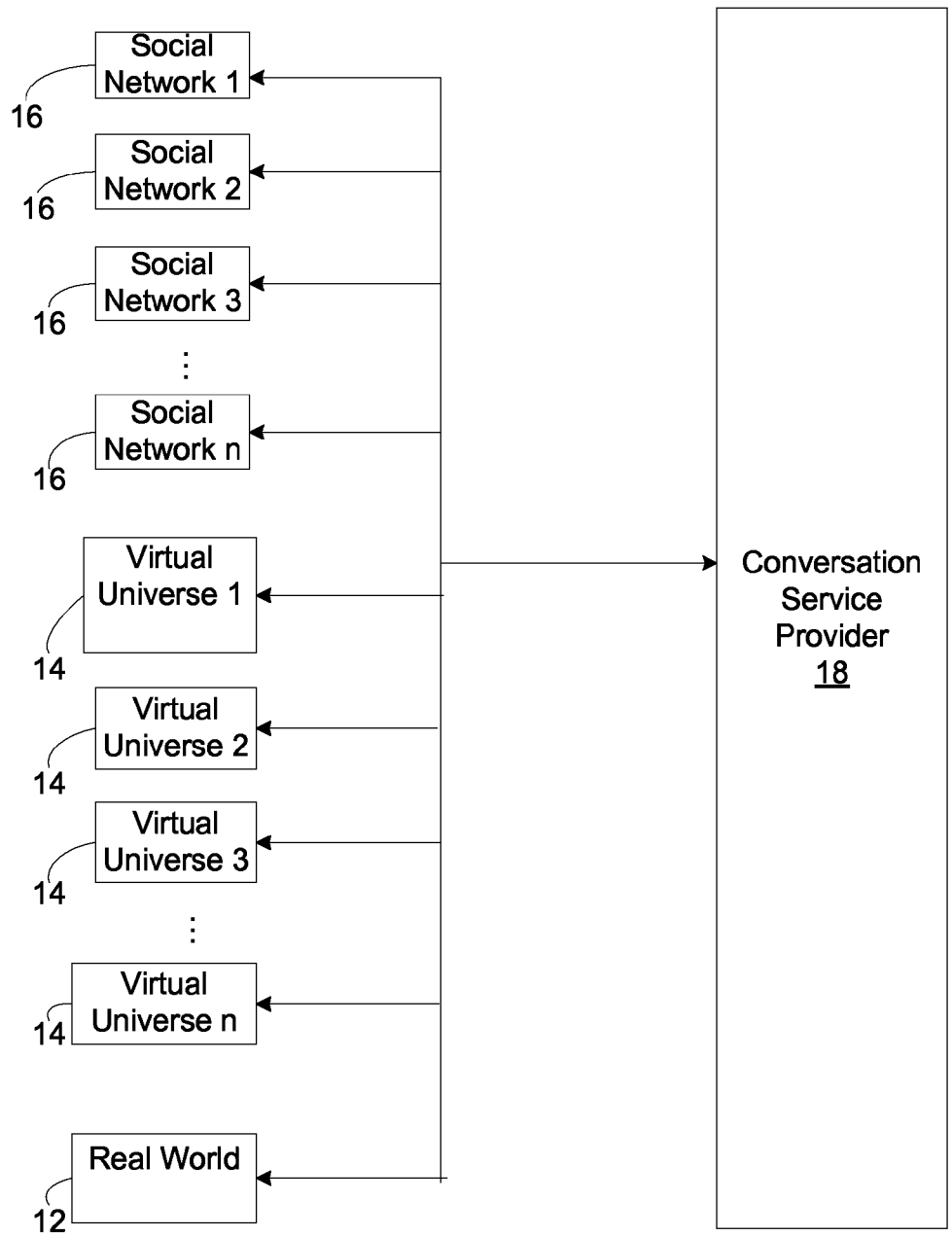
FIG. 2 shows a more detailed view of the networking configuration shown in FIG. 1.

Additionally, it is possible that the seamless conversation service tool can be used to seamlessly continue the conversation as parties move from interacting environments of the same classification (e.g., different virtual universes or social networks). For example, parties might want to continue the conversation as they move from one virtual universe to another virtual universe. FIG. 2 shows a more detailed view 20 of the networking configuration 10 shown in FIG. 1. In particular, FIG. 2 shows the arrangement of the configuration for multiple interacting environments of the same classification. More specifically, FIG. 2 shows virtual universes 1, 2, 3, . . . n and social networks 1, 2, 3, . . . n. Although FIG. 2 shows only one real world environment 12, it is conceivable that the real world could be broken into a multiples segments as shown for the virtual universes and the social networks.

The seamless conversation service tool used by the conversation service provider 18 facilitates the commencement of conversations that are occurring in these interacting environments. Facilitation is the process to accept a user interaction of a first calling user to start a conversation with other called users, to offer either a list of available users available to be called or some means for the calling user to enter the partner identification manually. The commencement of the conversation includes searching for the most suitable communication path by examining the contexts of the initiating user as well as of the ones from the "called" users. The established conversation is monitored for changes in user context. Identified changes in the user context are analyzed and used to decide whether to enable or prevent the seamless transfer of the conversation. In particular, user context data describing attributes that are relevant to behavioral needs of the conversing parties are extracted from the conversation. As mentioned above, attributes that are relevant to behavioral needs in the interacting environment can include a wide range of attributes such as location, presence, identity, activity, conversational, and search information. A rules database including a plurality of predetermined communication rules and a user context database containing a plurality of user context data are then used in the analysis to decide whether to transfer the conversation to another interacting environment. Below are more details of the operation of the seamless conversation service tool.

Figure 3:
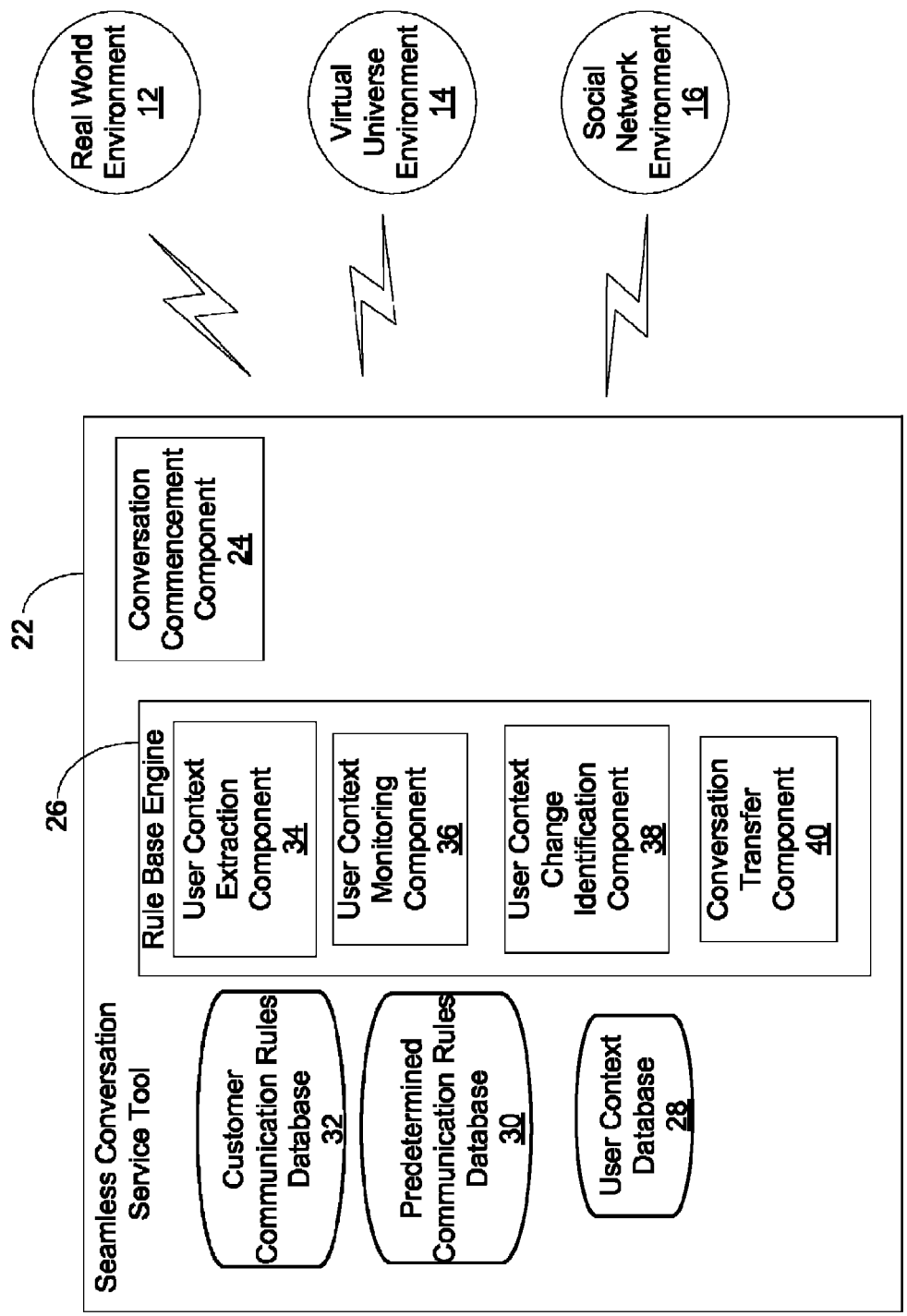
FIG. 3 shows a seamless conversation service tool that can be utilized by the conversation service provider shown in FIGS. 1 and 2 according to one embodiment of this invention.

FIG. 3 shows a seamless conversation service tool 22 that is utilized by the conversation service provider 18 according to one embodiment. The seamless conversation service tool 22 includes a conversation commencement component 24 configured to facilitate the commencement of a conversation between two or more parties occurring over a communication path in one of the interacting environments (i.e., real world environment 12, virtual universe environment 14 or social network environment 16). The conversation commencement facilitation component 24 detects a conversation in the manner described above A rule base engine 26 uses a user context database 28 to determine the user context of the conversation. In addition, the rule base engine 26 uses communication rules stored in a predetermined communication rules database 30 and a customer communication rules database 32 to decide whether to enable or deny a request to seamlessly transfer from one interacting environment to another environment.

The user context database 28 contains general and historical user context data for parties associated with the real world environment, virtual universe environment 14 and social network environment 16. In one embodiment, the general and historical user context data contains information describing attributes that are relevant to behavioral needs in the interacting environments and can include a wide range of attributes such as location, presence, identity, activity, conversational, and search information. This type of information can be acquired using conventional data acquisition techniques and assessed for user context by using well-known machine learning techniques that include supervised and unsupervised learning.

In particular, these well known unsupervised machine learning techniques can be used to discover and update user contexts from past behavior in these interacting environments combined with supervised machine learning techniques to refine user context attributes and values. Additional details of using unsupervised and supervised machine learning techniques are set forth in U.S. Pat. No. 6,701,311 entitled "Customer Self Service System for Resource Search and Selection"; U.S. Pat. No. 6,778,193 entitled "Customer Self Service Iconic Interface for Portal Entry and Search Specification"; U.S. Pat. No. 6,853,998 entitled "Customer Self Service Subsystem for Classifying User Contexts"; U.S. Pat. No. 6,643,639 entitled "Customer Self Service Subsystem for Adaptive Indexing of Resource Solutions and Resource Lookup"; U.S. Pat. No. 6,785,676 entitled "Customer Self Service Subsystem for Response Set Ordering and Annotation"; U.S. Pat. No. 6,693,651 entitled "Customer Self Service Iconic Interface for Resource Search Results Display and Selection"; and U.S. Pat. No. 6,873,990 entitled "Customer Self Service Subsystem for Context Cluster Discovery and Validation," all of which are incorporated herein by reference.

In addition to containing user context data, the user context database 28 can store other general information on parties associated with the various interacting environments (real world environment 12, virtual universe environment 14 and social network environment 16) such as names, addresses, interests, ages, email addresses, billing information, etc.

Furthermore, the user context database 28 can store information that is specific to the interacting environment. For example, for the virtual universe environment 14, the database 28 can store information such as all of the avatars that a user may have, the profile of each avatar, avatar characteristics (e.g., appearance, voice and movement features), inventories listing properties and possessions that each avatar owns such as hair pieces, jewelry, houses, cars, sporting equipment, appearance, attire, general interaction information by avatars such as the number and nature of their type of teleports within the virtual universe, patterns of movement within the virtual universe that are indicative of how adept avatars are with regard to moving and navigating about the universe, eating preferences at restaurants in the virtual universe, recreational preferences, etc.

The communication rules in the predetermined communication rules database 30 contain a plurality of predetermined communication rules decided by the conversation service provider 18 with respect to transferring the conversation from one interacting environment to another or to other environments that are within the same general classification. For example, one possible rule could be that voice conversations will not be transferred to a virtual universe environment where the ambient decibel level of noise in the destination area is above a certain threshold without warning the participants in the conversation about the noise level and offering them alternative communications channels such as text chatting. Depending on the desired implementation, the conversation service provider 18 can utilize a wide variety of rules.

The communication rules in the customer communication rules database 32 contain a plurality of customer rules decided by the parties within the various interacting environments that relate to the transferring of a conversation from one interacting environment to another or to other environments that are within the same general classification. For example, one possible rule could be that a party in the real world has specified a request that he or she receive no conversation from a virtual environment from the hours of 11:00 pm to 7:00 am. In addition to a calendar entry with a form of "DND" or "not available" based on the time of day such as the one mentioned above, it is also possible to use on-line collected context data like "When I am on a music stage in a virtual universe (and therefore hearing music), divert any phone calls or instant messages to a message box" or "when I am in a conversation with buddy XYZ do not let buddy ABC know about it", or "when I am in a conversation with buddy XYZ, load a English to French translator". Like the communication rules, a wide variety of rules can be specified.

As shown in FIG. 3, the rule base engine 26 includes several components that enable it to determine the user context of the conversation and decide whether to enable or deny the conversation to be seamlessly transferred from one interacting environment to another. For instance, a user context extraction component 34 is configured to extract user context data describing attributes that are relevant to behavioral needs of the two or more parties that have started a conversation. In one embodiment, the user context extraction component 34 uses well-known data acquisition techniques to extract the attribute values from the conversation.

A user context monitoring component 36 is configured to monitor a user context associated with the conversation. In particular, the user context monitoring component 36 is configured to ascertain the user context of the conversation in accordance with the extracted user context data. In one embodiment, the user context monitoring component 36 compares the extracted user context data which may be received by push or pull technologies to the user context stored in the user context database 28.

A user context change identification component 38 is configured to identify changes in the user context of the on-going conversation. If there are changes, then the user content change identification component 38 ascertains what action is permitted for such changes as specified by the plurality of predetermined communication rules and the plurality of customer communication rules.

A conversation transfer component 40 is configured to transfer the conversation between the interacting environments in response to an identified change in the user context that has been specified in the communication rules set forth in the databases 30 and 32 as permitting a transfer. In operation, the conversation transfer component 40 will transfer the conversation from one interacting environment to another such that a transparency of functionality of the communication path is maintained. In the embodiment where the conversation is continued per a request made from one or more of the parties, the conversation transfer component 40 can simply permit that request or check the communication rules set forth in databases 30 and 32 before deciding whether to enable or deny the transfer of the conversation to another interacting environment.

Figure 4:
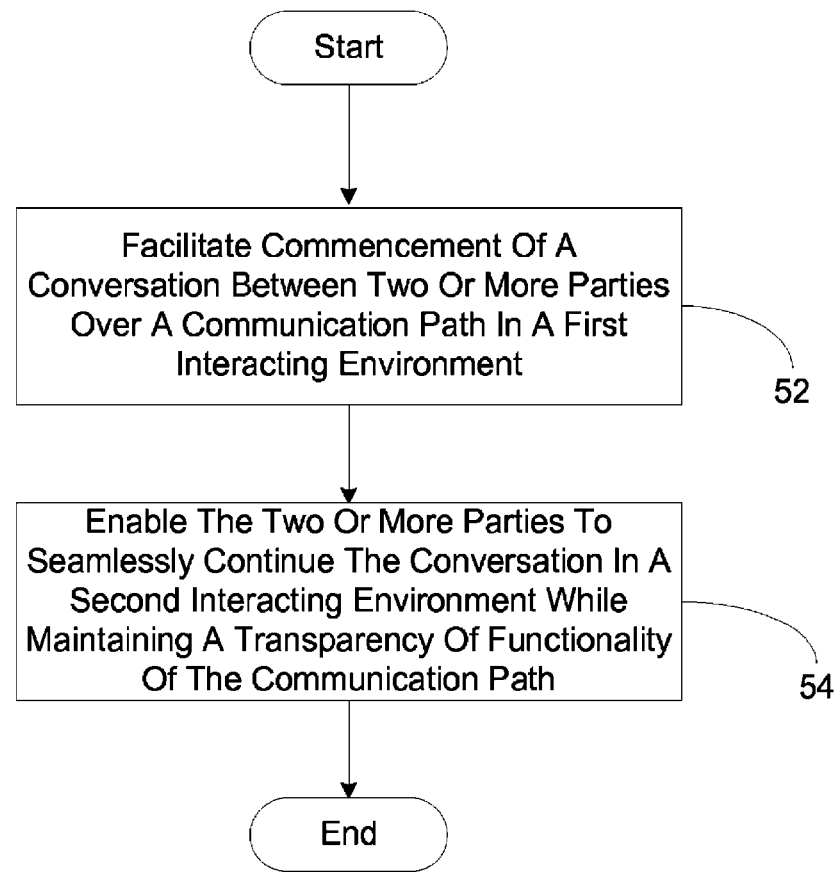
FIG. 4 shows a flow chart describing the general operations performed by the seamless conversation service tool shown in FIG. 3

FIG. 4 shows a flow chart 50 describing the general operations performed by the seamless conversation service tool 22 which have been described above. In FIG. 4, flow chart 50 begins at 52 by facilitating commencement of a conversation between two or more parties over a communication path in a first interacting environment. At 54, the seamless conversation service tool enables the two or more parties to seamlessly continue the conversation in a second interacting environment while maintaining a transparency of functionality of the communication path. In certain embodiments, the first and second interacting environments comprise an environment selected from the group consisting of a virtual universe, social network and real world. In certain embodiments, the communication path comprises a path selected from the group consisting of telecommunications, chatting, messaging, emailing, blogging, video communications and file sharing. In certain embodiments, the enabling of the two or more parties to seamlessly continue the conversation comprises using a plurality of predetermined communication rules to decide whether to enable the conversation. In one embodiment, the plurality of predetermined communication rules comprise customer specified communication rules and provider specified communication rules.

Although not shown in flow chart 50 of FIG. 4, the seamless conversation service tool 22 can monitor the user context associated with the conversation. In certain embodiments, this comprises identifying a change in the user context associated with the conversation and transferring the conversation over the communication path from the first interacting environment to the second interacting environment in response to an identified change in the user context. In other embodiments, the monitoring of user context comprises extracting user context data describing attributes that are relevant to behavioral needs of the two or more parties and ascertaining the user context of the conversation in accordance with the extracted user context data. In one embodiment, the ascertaining of a user context of the conversation comprises using machine learning techniques that include unsupervised and supervised machine learning techniques.

Below are some examples of user context changes in which the seamless conversation service tool 22 can be used to transfer a conversation from one interacting environment to another. One example is that the subject of a text chat based conversation between two parties in a virtual universe switches to something business confidential or personal confidential. Normally, users have to be aware of the relative security of their different communication paths between the real world and virtual universe or within the virtual universe or social network. As a result, the parties have to switch to a different channel in order to minimize the risk of having their communication monitored. In this scenario, the seamless conversation service tool 22 would detect the change in user context and transfer the conversation seamlessly to another interacting environment or another environment within the same classification. In an embodiment where it is desired to keep the conversation in the same interacting environment (e.g., a virtual universe), the seamless conversation service tool 22 could provide a designated room for the conversation to continue and have the parties teleport to that room.

In one embodiment, the change in the subject of the conversation could be detected by well known text analysis techniques which can also be applied to audio if the audio is first converted to text via a well-known speech recognition technique. An example of text analysis techniques is IBM's OmniFind™ software and an example of speech recognition techniques to convert speech to text is Nuance's Recognizer software.

In another example, a person using a social network can contact a friend by clicking on their name. The friend is currently in a virtual universe and their communications service provider enables them to have a text chat based communication. The friend's avatar then enters a virtual amusement park where the activity level will make it difficult to use text messaging. The seamless conversation service tool 22 can be used to switch to a voice mode path in order to continue their conversation because of the noted change in the user context. As mentioned before, the parties could manually request that the change be made.

In yet another example, a third party in the real world is using a voice phone and is invited to join an instant messaging based communication between two avatars in a virtual universe. This third party's native language is French, not English. Normally, the new participant would need to ask the others to type slowly because the native language of the new participant would not be detected by the telecommunications provider who might otherwise automatically enable real time translation services so the typed English messages are translated into French and conveyed by speech synthesis to the third party. Again the seamless conversation service tool 22 can be used to seamlessly make this transfer.

Although the description heretofore, describes the seamless conversation service tool 22 apart from the virtual universe environment 14 and the social network environment 16, it is possible that it may reside on a computer system associated with either environment and communicate directly to other interacting environments. In other embodiments, parts of the seamless conversation service tool 22 might reside on computer systems associated with all interacting environments.

In other embodiments, the seamless conversation service tool 22 might be used as a service to charge fees for each time that the conversation is transferred. In this embodiment, the provider of the virtual universes or social networks or third party service providers could offer this tool as a service by performing the functionalities described herein on a subscription and/or fee basis. In this case, the provider of the virtual universes, social networks or third party service providers can create, deploy, maintain, support, etc., the seamless conversation service tool 22 that performs the processes described in the invention. In return, the virtual universes, social networks or the third party service provider can receive payment from the users or providers of these interacting environments.

In still another embodiment, the methodologies disclosed herein can be used within a computer system to provide seamless transfer of conversations in interacting environments. In this case, the seamless conversation service tool 22 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
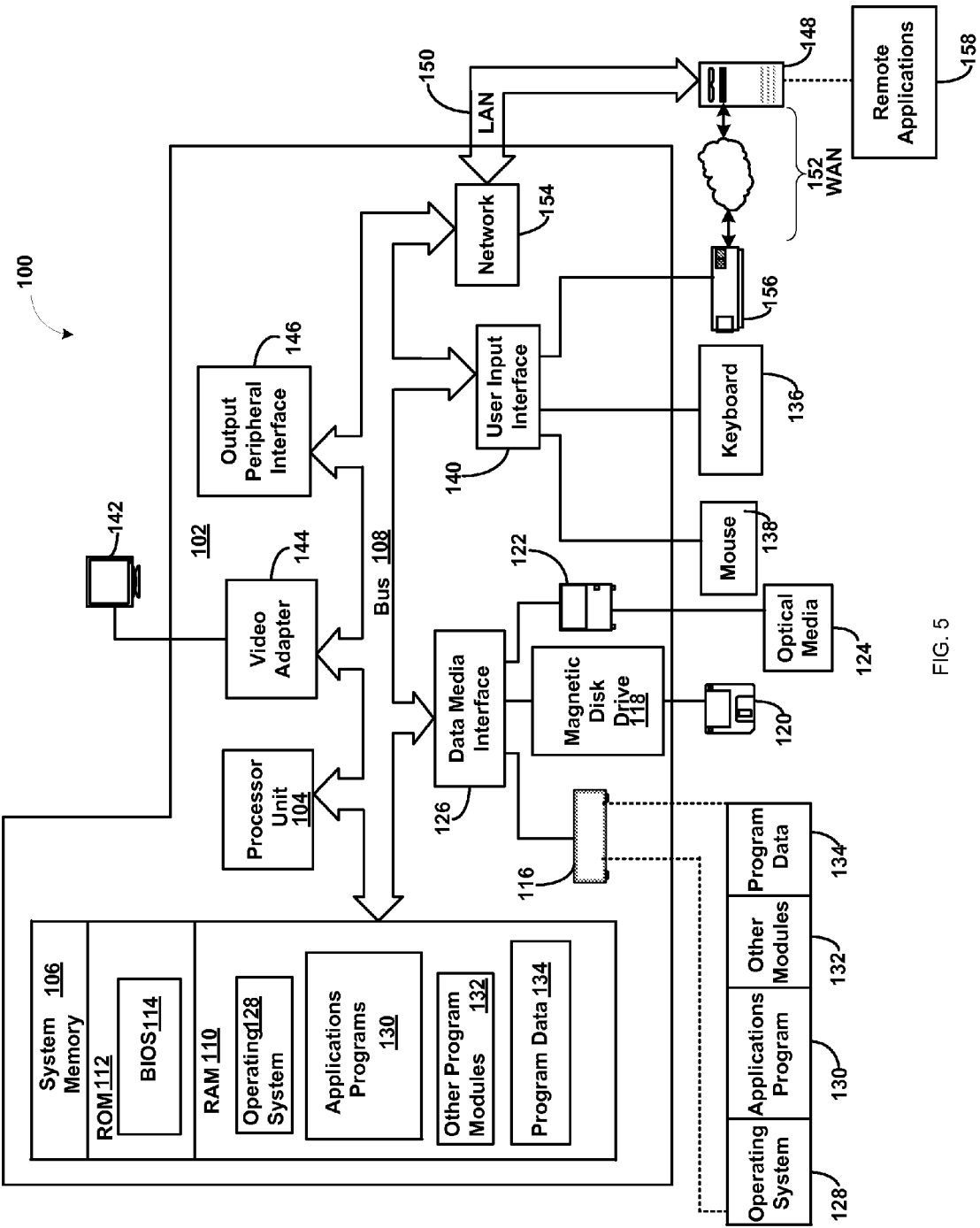
FIG. 5 shows a schematic of an exemplary computing environment in which elements of the networking configuration shown in FIG. 1 may operate.

FIG. 5 shows a schematic of an exemplary computing environment in which elements of the networking configuration shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 5.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130 (e.g., the seamless conversation service tool 22), other program modules 132, and program data 134. Each of the operating system 128, one or more application programs 130 other program modules 132, and program data 134 or some combination thereof, may include an implementation of the networking configuration shown in FIG. 1.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 4 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing a seamless conversation service between interacting environments. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed on a computing device, for providing a seamless conversation service between interacting environments, comprising:
using the computing device to perform actions including:
facilitating commencement of a conversation between two or more parties over a communication path in a first interacting environment;
monitoring a user context associated with the conversation between the two or more parties, wherein the monitoring of user context between the two or more parties comprises extracting user context data describing attributes that are relevant to behavioral needs of the two or more parties; and
enabling the two or more parties to seamlessly continue the conversation in a second interacting environment while maintaining a transparency of functionality of the communication path, wherein the enabling of the two or more parties to seamlessly continue the conversation comprises using a plurality of predetermined communication rules and the user context being monitored to decide whether to enable the conversation to continue, wherein the plurality of predetermined communication rules comprise customer specified communication rules and provider specified communication rules.

2. The method according to claim 1, wherein the first and second interacting environments comprise an environment selected from the group consisting of a virtual universe, social network and real world.

3. The method according to claim 1, wherein the communication path comprises a path selected from the group consisting of telecommunications, chatting, messaging, emailing, blogging, video communications and file sharing.

4. The method according to claim 1, further comprising receiving an indication that the two or more parties desire to continue the conversation in the second interacting environment.

5. The method according to claim 4, further comprising seamlessly transferring the conversation over the communication path from the first interacting environment to the second interacting environment in response to receiving the indication.

6. The method according to claim 1, further comprising identifying a change in the user context associated with the conversation between the two or more parties.

7. The method according to claim 6, further comprising transferring the conversation over the communication path from the first interacting environment to the second interacting environment in response to an identified change in the user context.

8. The method according to claim 1, further comprising ascertaining the user context of the conversation in accordance with the extracted user context data.

9. The method according to claim 8, wherein the ascertaining of a user context of the conversation comprises using machine learning techniques that include unsupervised and supervised machine learning techniques.

10. A computer system for providing a seamless conversation service between two or more interacting environments, comprising:
   at least one processing unit;
   memory operably associated with the at least one processing unit; and
   a seamless conversation service tool storable in memory and executable by the at least one processing unit, the tool comprising:
      a conversation commencement component configured to facilitate commencement of a conversation between two or more parties occurring over a communication path in one of the two or more interacting environments;
      a user context extraction component configured to extract user context data describing attributes that are relevant to behavioral needs of the two or more parties having the conversation;
      a user context monitoring component configured to monitor a user context associated with the conversation between the two or more parties;
      a user context change identification component configured to identify a change in the user context of the conversation;
      a rules database including a plurality of predetermined communication rules containing customer specified communication rules and provider specified communication rules; and
      a conversation transfer component configured to transfer the conversation between the two or more interacting environments in response to the identified change in the user context, while maintaining a transparency of functionality of the communication path, wherein the conversation transfer component transfers the conversation between the two or more interacting environments in accordance with the plurality of predetermined communication rules in the rules database.

11. The computer system according to claim 10, wherein the two or more interactive environments comprise one of a virtual universe or a social network.

12. The computer system according to claim 10, wherein the user context monitoring component is configured to ascertain the user context of the conversation in accordance with the extracted user context data.

13. The computer system according to claim 12, further comprising a user context database including a plurality of user context data.

14. The computer system according to claim 13, wherein the user content change identification component identifies a change in the user context of the conversation as function of the extracted user context data and the plurality of user context data in the user context database.

15. The computer system according to claim 14, wherein the conversation transfer component transfers the conversation between the two or more interactive environments as function of the identified change in the user context and the plurality of predetermined communication rules.

16. The computer system according to claim 10, wherein the conversation transfer component is configured to provide a designated room for the conversation to continue in response to a determination that the conversation will continue in a virtual environment, wherein the conversation transfer component selects the designated room as a function of the user context of the conversation.

17. A non-transitory computer-readable medium storing computer instructions, which when executed, enables a computer system to provide a seamless conversation service between two or more interacting environments, the computer instructions comprising:
   facilitating commencement of a conversation between two or more parties occurring over a communication path in one of the two or more interacting environments;
   monitoring a user context associated with the conversation, wherein the monitoring of user context between the two or more parties comprises extracting user context data describing attributes that are relevant to behavioral needs of the two or more parties;
   identifying a change in the user context of the conversation between the two or more parties; and
   enabling a transfer of the conversation between the two or more interacting environments in response to the identified change in the user context, while maintaining a transparency of functionality of the communication path, wherein the enabling of the two or more parties to seamlessly continue the conversation comprises using a plurality of predetermined communication rules to decide whether to enable the conversation, wherein the plurality of predetermined communication rules comprise customer specified communication rules and provider specified communication rules.

18. The non-transitory computer-readable medium according to claim 17, further comprising instructions for receiving an indication that the two or more parties desire to continue the conversation in an environment that is different from the environment in which the conversation has been established.

19. A method for providing a seamless conversation service tool as a service for facilitating a seamless transfer of a conversation between interacting environments, comprising:
   deploying the seamless conversation service tool in a computer system as a service that is in communication with one or more interacting environments, wherein the seamless conversation service tool is operable to:
   facilitate commencement of a conversation between two or more parties over a communication path in a first interacting environment;
   monitor a user context associated with the conversation between the two or more parties, wherein the monitoring of user context between the two or more parties comprises extracting user context data describing attributes that are relevant to behavioral needs of the two or more parties;
   enable the two or more parties to seamlessly continue the conversation in a second interacting environment while maintaining a transparency of functionality of the communication path, wherein the enabling of the two or more parties to seamlessly continue the conversation comprises using a plurality of predetermined communication rules and the user context being monitored to decide whether to enable the conversation to continue, wherein the plurality of predetermined communication rules comprise customer specified communication rules and provider specified communication rules; and
   levy a transfer fee to a provider of the one or more interacting environments or the two or more parties conducting the conversation.

20. A method for deploying a seamless conversation service tool for use in a computer system that facilitates a seamless transfer of a conversation between interacting environments, comprising:

configuring the computer system to perform the method comprising:

facilitating commencement of a conversation between two or more parties over a communication path in a first interacting environment;

monitoring a user context associated with the conversation between the two or more parties, wherein the monitoring of user context between the two or more parties comprises extracting user context data describing attributes that are relevant to behavioral needs of the two or more parties; and enabling the two or more parties to seamlessly continue the conversation in a second interacting environment while maintaining a transparency of functionality of the communication path, wherein the enabling of the two or more parties to seamlessly continue the conversation comprises using a plurality of predetermined communication rules and the user context being monitored to decide whether to enable the conversation to continue, wherein the plurality of predetermined communication rules comprise customer specified communication rules and provider specified communication rules.

* * * * *